Dec. 19, 1967     A. W. DREYFOOS, JR     3,359,424
COMPENSATING SYSTEM FOR PHOTOCELLS OF EXPOSURE CONTROL
APPARATUS FOR MAKING COLOR PRINTS
Filed June 29, 1964

INVENTOR.
ALEX W. DREYFOOS, JR
BY
ATTORNEY

United States Patent Office
3,359,424
Patented Dec. 19, 1967

3,359,424
COMPENSATING SYSTEM FOR PHOTOCELLS OF EXPOSURE CONTROL APPARATUS FOR MAKING COLOR PRINTS
Alex W. Dreyfoos, Jr., Port Chester, N.Y., assignor to Photo Electronics Corporation, Port Chester, N.Y., a corporation of New York
Filed June 29, 1964, Ser. No. 378,773
5 Claims. (Cl. 250—208)

The present invention relates to a compensating system operable to compensate for the undesirable characteristics of the photoelectric cells normally utilized with apparatus for the making of color prints.

Apparatus for the making of color prints and enlargements thereof from a film transparency are now well known in the art. In the use of such apparatus in order to produce fidelity of color reproduction it is customary to subject several photoelectric cells to the light passing through the transparency and to allow such light beam to pass through a filter interposed in front of each photoelectric cell. Such filters are usually of the three primary colors of green, red and blue so that the distribution of these colors in the light beam can be determined by the photoelectric cells and the light intensity along with the ratio of these primary colors thereafter adjusted by proper manipulation of the photographic printing apparatus so as to produce prints and enlargements having the same fidelity of color as that of the transparency.

The difficulty, however, with such apparatus has resided in the fact that certain photoelectric cells, and particularly those of the cadmium sulfide type, are somewhat sluggish in their response to changes in color characteristics which can lead to undesirable deviation from one setting of the apparatus to another resulting in non-uniformity in color rendition of the ensuing print.

It is accordingly the primary object of the present invention to provide a compensating system for the undesirable sluggish response characteristic of photoelectric cells particularly when employed with exposure control apparatus for the making of color prints from film transparencies.

Another object of the present invention is the provision of a compensating system operable to cause the photoelectric cells of an exposure control apparatus to track each other as the light intensity impinging upon such cells is changed.

The foregoing objects together with others which will become readily apparent to those skilled in the art as the following description proceeds are achieved in accordance with the present invention by the provision of a compensating system for the three photoelectric cells representative of the primary colors of green, red and blue normally employed in exposure control apparatus for the making of color prints from film transparencies. Such compensating system operates to reduce or nullify the sluggish response of the photoelectric cells by causing such cells to track each other as the light intensity impinging thereon changes. This is accomplished by reducing the rate of impedance change in the green and blue cells to match the lower rate of impedance change of the red cell by utilization of a bridge circuit employing transistors as emitter followers that sense the voltage across the photoelectric cells during impingement of the printing light beam thereon.

The present invention may be more fully appreciated by reference to the accompanying drawing wherein.

Figure 1:
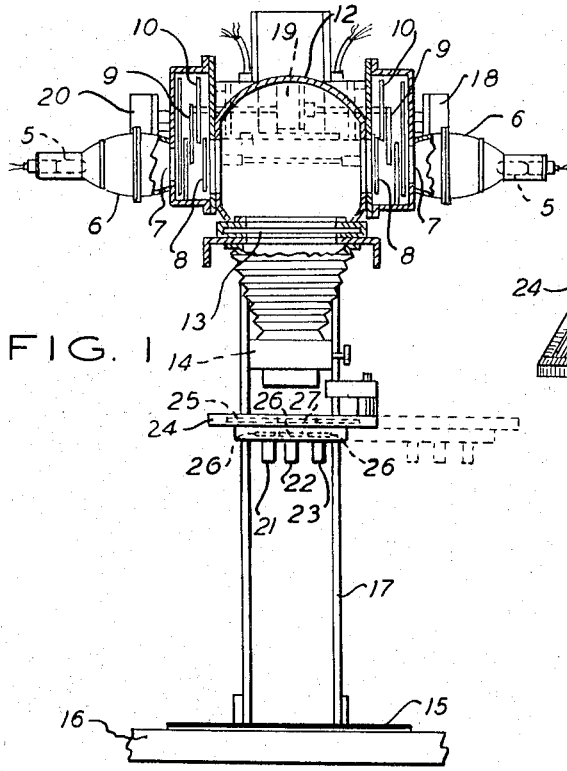
FIGURE 1 shows an illuminating system of a photographic printer or enlarger as used in the making of color prints and enlargements employing photoelectric cells for integrating light of three primary colors and with which the compensating system of the present invention may be readily employed.
Figure 4:
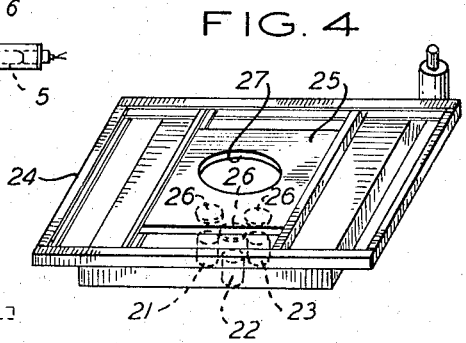
FIG. 4 is a fragmentary prospective view of the photoelectric cell assembly with its supporting frame carrying the movable apertured plate and primary color filters.

Referring now to the drawing in detail one photographic printing and enlarging apparatus with which the present invention may be employed and as shown in FIG. 1 comprises a lamp 5 but preferably comprises several which are respectively surrouded by specular light-collecting reflectors 6 whereby a very high percentage of the emitted light is caused to pass through an aperture 7 in front of which a number of adjustable filters, 8, 9 and 10 are arranged. These filters are preferably in colors complimentary to the primary colors of the selected system, i.e., in a three color system with the customary primary colors of red, green and blue, the filters 8, 9 and 10 would be "cyan," "magenta" and "yellow."

After passing through one or several of these filters the light enters a mixing chamber or integrating sphere 12, which has a non-glossy, diffusely reflecting white interior, so that by repeated diffuse reflection the light is uniformly distributed over the area of a film transparency 13 and passes therethrough where the usual adjustable focusing lens 14 projects an enlarged image of the transparency 13 on a sensitized color paper 15 which is disposed a suitable distance below the lens on a base or table 16. Also, as shown in FIG. 1, the entire assembly is attached to a supporting structure 17 which extends vertically from the base or table 16 holding the sensitized paper 15. Each of the filters 8, 9 and 10 may be operated by a mechanical linkage but as shown in FIG. 1 they are coupled to an individual reversible motor 18, 19 and 20, with the motor for each filter of the same color being mechanically connected and hence simultaneously operable, so that such pair of identical color filters are operated by its own individual motor into and out of the light beam emerging from the respective apertures 7 and passing into the mixing chamber 12.

The motors 18, 19 and 20 are operable in response to preselected settings determinable by the response of photoelectric cells 21, 22 and 23 to the light beam emerging from the integrating sphere 12 and passing through the transparency 13. These photoelectric cells are shown secured to a supporting frame 24, having an apertured plate 25 universally movable in a horizontal plane, and disposed in back of filters 26 each of which is one of the primary colors of green, red and blue. The photoelectric cell assembly is swung about the supporting structure 17 so as to dispose the supporting frame 24 with its plate 25 below the enlarging lens 14. Movement of this plate 25 in its frame 24 thus disposes the plate aperture 27 immediately beneath the enlarging lens 14 directly in the path of the light beam and in alignment with any one or all of the primary color filters 26. Each photoelectric cell 21, 22 and 23 is accordingly responsive respectively to the intensity of the light of each of these primary colors of green, red and blue as such are present in the light beam. These photoelectric cells may be connected into the electrical circuit for energization of the light source 5 and the reversible motors 18, 19 and 20, or the photographic printer manually operated after proper determination by the photoelectric cell response. In any event the motors operate their respective filters 8, 9 and 10 to properly adjust the intensity of each of the primary colors so as to produce a print having true fidelity of color as present in the transparency 13.

Unfortunately, however, photoelectric cells as hereinbefore mentioned have a very sluggish response to changes in voltage and since alteration of the primary colors impinging upon each photoelectric cell causes a voltage change across the cell used in exposure control apparatus for photographic printers and enlargers they have heretobefore been too frequently susceptible to error. This objectionable characteristic is accordingly compensated for in accordance with the present invention which thus effectively minimizes or eliminates the sluggish response of the photoelectric cells used in connection with such photographic printers and enlargers.

Figure 2:
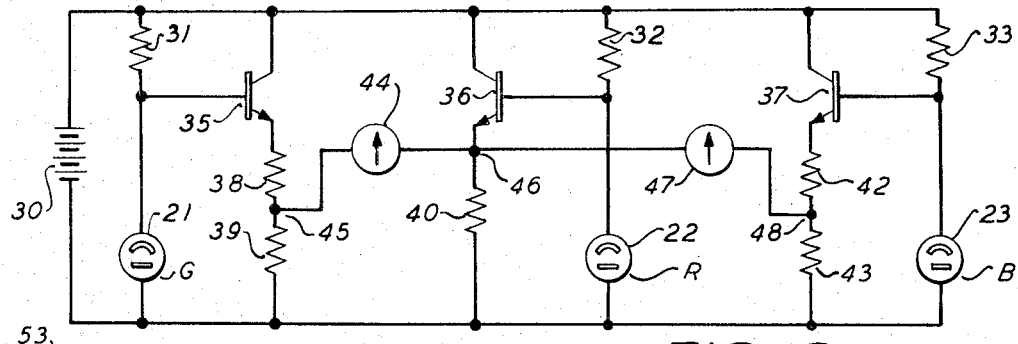
FIG. 2 is a diagrammatic illustration of the bridge circuit of the present invention operable to compensate for the sluggish response of the photoelectric cells.

By reference now more particularly to FIG. 2 the compensating bridge circuit as therein shown includes the photoelectric cell 21 which may be responsive to green light, the cell 22 responsive to red light and the cell 23 responsive to blue light, with the relative quantity or intensity of light striking each cell being adjustably by operation of the aforesaid motor driven filters 8, 9 and 10. Each of these photoelectric cells is connected to a voltage source 30, with the green cell 21 in series with a load resistor 31, the red cell 22 in series with a load resistor 32, and the blue cell 23 in series with a load resistor 33. In initially setting the values of the bridge circuit components the photoelectric cells 21, 22 and 23 are first exposed to a light beam through the aperture 27 of movable plate 25 which approximates one third the average intensity and with a relative green to red to blue distribution therein approximating that to be encountered in the operation of the photographic printer. The amount of light striking each cell is adjusted by movement of plate 25 in its frame 24 so that the time constants, when measured with a voltage $V_1$ across the cells, are equal in going from darkness to this light level of one third average intensity, it being recognized that all photoelectric cells have a time constant that becomes shorter as the light level is increased.

A notation is then made of the impedance of each photoelectric cell at this one third average intensity light level, which for purposes of illustration, may be considered as showing 1.0 megohm for the green cell 21, 2.0 megohms for the red cell 22, and 1.5 megohms for the blue cell 23. Thereafter the intensity of the light is increased to three times the average operating intensity with the relative distribution of the green, red and blue radiation therein remaining constant. Another notation is then made of the impedance of each photoelectric cell at this increased intensity and it may be found that although the light level was changed by a factor of nine times, the impedance of the photoelectric cells will have changed by a lesser amount. For example, the impedance of the green cell may now be .14 megohm and thus changed only seven times, the impedance of the red cell .33 megohm for a change of six times, and that of the blue cell .20 megohm being an increase of seven and one-half times.

In order for the three photoelectric cells 21, 22 and 23 to track each other as the light intensity is changed, the rate of impedance change of the green and blue cells 21 and 23 is reduced to match the lower rate of change of the red cell 22 by the provision of transistors 35, 36 and 37 which are emitter followers that sense the voltage across the respective photoelectric cells 21, 22 and 23 to which the base of each respective transistor is connected as shown in FIG. 2. The transistor 35 with its base connected to cell 21 has its emitter connected to a pair of series-connected load resistors 38 and 39, transistor 36 connected to cell 22 likewise has its emitter connected to a load resistor 40, and the emitter of transistor 37 for cell 23 completes a circuit to a pair of series-connected load resistors 42 and 43, with the collector of each transistor 35, 36 and 37 being connected to the voltage source 30.

The bridge circuit of FIG. 2 is also provided with a null meter 44 connected to a junction 45 between series-connected load resistors 38 and 39 and to a junction 46 between the load resistor 40 and the emitter of transistor 36 and similarly a null meter 47 is connected from junction 46 to a junction 48 between series-connected load resistors 42 and 43. In this bridge circuit a voltage similar to the voltage across the photoelectric cells 21, 22 and 23 is produced across the transistor load resistors with the result that the voltage at junction 45 (disregarding the null meter 44 and emitter-base voltage of transistor 35) would be $$\frac{R39}{R38+R39}$$

times the voltage of the green photoelectric cell 21. At the junction 46 the voltage would be that of the red photoelectric cell 22 and at junction 48 the voltage would be $$\frac{R43}{R42+R43}$$

times the voltage of the blue photoelectric cell 23. Transistor load resistors 38 and 39 are accordingly so selected, as indicated by the impedance reading of the cells hereinbefore mentioned, that the voltage at junction 45 is 6/7 of the voltage across green photoelectric cell 21 and likewise the transistor load resistors 42 and 43 are so chosen that the voltage at junction 46 is 6/7.5 of the blue photoelectric cell 23.

Likewise the photoelectric cell load resistors 31, 32 and 33 are carefully chosen so that with the normal light intensity striking the photoelectric cells 21, 22 and 23, the voltages across such cells and hence at the junctions 45, 46 and 48 are equal to each other. Moreover, such voltage is approximately equal to the time constant test voltage $V_1$ which itself is equal to one-half the bridge voltage across the source 30, with the relationship of such voltages resulting in the null meters 44 and 47 across the junctions 45–46 and 46–48 thus reading a null, until such time as the relative red to green or red to blue light distribution changes which will then be indicated by the null meters.

However, if the light intensity is increased or decreased, with the relative green, red and blue distribution remaining at the original ratio, the voltage at junctions 45, 46 and 48 will likewise increase or decrease but since they nevertheless remain equal the null meters 44 and 47 continue to read a null. If the lamp of the photographic printer is turned off for a moment and then relighted, the voltage at junctions 45, 46 and 48 will rise slowly reaching its final value several seconds after the light is turned on. By selecting the light distribution on the photoelectric cells and the resistor values in accordance with the invention as shown and described herein relative to FIG. 2, the null meters show less deflection during the turn-on period than by any other choice of values. An analysis of the turn-on operation, however, indicates that in the compensating system of FIG. 2, the photoelectric cell rise time appears to comprise two time constants, one being a function of light level and the second related to the cell impedance and the voltage across such photoelectric cell. Consequently, the voltage across the cells 21, 22 and 23 goes from near that of the supply source 30 when no light is falling thereon to one-half such voltage several seconds after the light is turned on and impinges on the photoelectric cells which causes the above noted deflection of the null meters during the turn-on period.

Figure 3:
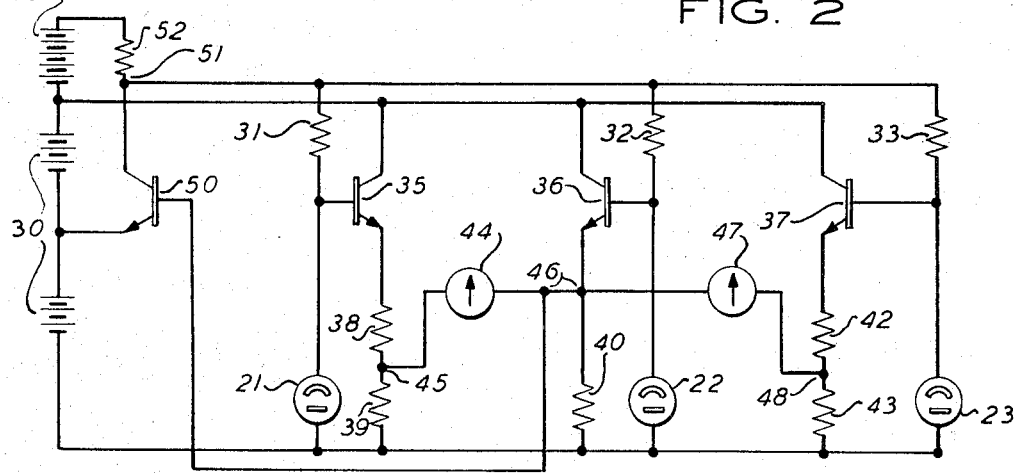
FIG. 3 is a modification of the bridge circuit of FIG. 2.

In the modification of the present invention as shown in FIG. 3 deflection of the null meter during turn-on is practically eliminated by holding the voltage across the red photoelectric cell constant. As shown in the circuit of FIG. 3 the photoelectric cell load resistors 31, 32 and 33 instead of being connected to the voltage supply source 30 are all connected together and tied to the collector of an additional transistor 50 at a junction 51.

This transistor 50 has a load resistor 52 and a voltage supply source 53 several times greater than that of the supply source 30 which latter in this modification is shown divided into two sections. The emitter of transistor 50 is tied to a reference voltage corresponding to one-half that of the source 30 and which is the desired photoelectric cell operating voltage. The base of this transistor 50 is connected to the junction 46 and hence to the emitter of the transistor 36 which is essentially equal to the voltage across the red photoelectric cell 22. If the light level on this red cell 22 decreases, thus increasing its impedance which thereupon tends to raise the voltage at the junction 46, transistor 50 starts to conduct more readily thus reducing the voltage at its collector (junction 51) and lowering the voltage across the red photoelectric cell 22, tending to keep it constant. Consequently, if the green and blue photoelectric cells 21 and 23 are nulled to the red photoelectric cell 22, the voltage across such green and blue cells will also be constant. This will accordingly minimize deflection of the null meters for all phenomena that are common to all three photoelectric cells while preserving good deflection sensitivity to any change in the relative distribution of the red, green and blue components of the light to which such photoelectric cells are exposed.

It should thus be obvious to those skilled in the art that a compensating system is herein shown and described for the undesirable sluggish response characteristic of photoelectric cells particularly when utilized to determine the relative light distribution of the primary colors of green, red and blue in the light beam emerging from a photographic printer and enlarger. By making such determination particularly after the light beam has passed through a film transparency, the light intensity and ratio of these primary colors can then be set for the printing apparatus so as to produce prints having the same fidelity of color as that of the film transparency itself.

Although two embodiments of the present invention have been herein shown and described it is to be understood that still further modifications thereof may be made without departing from the spirit and scope of the appended claims.

I claim:
1. A compensating system operable to compensate for the undesirable characteristics of photoelectric cells in a color balancing bridge circuit for determining the ratio of light of primary colors in the light beam emerging from a photographic printer and enlarger comprising:
   (a) a source of electrical energy,
   (b) a plurality of photoelectric cells respectively responsive to the distribution of at least three of the primary colors present in the light beam impinging thereon, each said photoelectric cell being connected to said source through a series connected load resistor for producing a predetermined voltage across said cell indicative of the intensity of the primary color to which each respective cell is responsive,
   (c) voltage sensing means connected to each photoelectric cell including a transistor having an emitter-collector circuit connected to said source for producing a voltage having a predetermined ratio relative to the voltage across each respective photoelectric cell to which the base of its associated transistor is connected, and
   (d) indicator means connecting the voltage sensing means of one of said photoelectric cells with the voltage sensing means of each of the remaining photoelectric cells and operable to indicate when a difference exists in the ratio of the predetermined voltage across the respective photoelectric cells due to a change in the distribution ratio between the primary colors in the light beam impinging on said photoelectric cells.

2. A compensating system operable to compensate for the undesirable characteristics of photoelectric cells in a color balancing bridge circuit for determining the ratio of light of primary colors in the light beam emerging from a photographic printer and enlarger comprising:
   (a) a source of electrical energy,
   (b) a plurality of photoelectric cells respectively responsive to the distribution of the primary colors of green, red and blue present in the light beam impinging thereon, each said photoelectric cell being connected to said source through a series connected load resistor for producing a predetermined voltage across said cell indicative of the intensity of the primary color to which each respective cell is responsive,
   (c) voltage sensing means connected to each photoelectric cell including a transistor having an emitter-collector circuit connected to said source and a load resistor for producing a predetermined voltage, such voltage in one instance being equal to that across one of said photoelectric cells and the voltage across the remaining photoelectric cells as produced by their associated voltage sensing means having a predetermined ratio relative to the voltage produced by said one photoelectric cell, and
   (d) indicator means connecting the voltage sensing means of said one photoelectric cell with the voltage sensing means of each of the remaining photoelectric cells and operable to indicate when a difference exists in the ratio of the predetermined voltage across the respective photoelectric cells due to a change in the distribution ratio between the primary colors of green, red and blue in the light beam impinging on said photoelectric cells.

3. A compensating system operable to compensate for the undesirable characteristics of photoelectric cells in a color balancing bridge circuit for determining the ratio of light of primary colors in the light beam emerging from a photographic printer and enlarger comprising:
   (a) a source of electrical energy,
   (b) a plurality of photoelectric cells respectively responsive to the distribution of the primary colors of green, red and blue present in the light beam impinging thereon, each said photoelectric cell being connected to said source through a series connected load resistor for producing a predetermined voltage across said cell indicative of the intensity of the primary color to which each respective cell is responsive,
   (c) voltage sensing means connected to each photoelectric cell including a transistor having an emitter-collector circuit connected to said source and a load resistor for producing a voltage having a predetermined ratio relative to the voltage across each respective photoelectric cell to which the base of its associated transistor is connected, the voltage produced by said voltage sensing means in one instance being equal to that across one of said photoelectric cells and the voltage produced by said voltage sensing means for the remaining photoelectric cells having a predetermined ratio relative to the voltage produced by the voltage sensing means for said one photoelectric cell, and
   (d) indicator means connecting the voltage sensing means of said one photoelectric cell with the voltage sensing means of each of the remaining photoelectric cells and operable to indicate when a difference exists in the ratio of the predetermined voltage between said sensing means and hence across the respective photoelectric cells connected thereto due to a change in the distribution ratio between the primary colors of green, red and blue in the light beam impinging on said photoelectric cells.

4. A compensating system operable to compensate for the undesirable characteristics of photoelectric cells in a color balancing bridge circuit for determining the ratio of light of primary colors in the light beam emerging from a photographic printer and enlarger comprising:
   (a) a source of electrical energy, (b) a plurality of photoelectric cells respectively responsive to the distribution of the primary colors of green, red and blue present in the light beam impinging thereon, each said photoelectric cell being connected to said source through a series connected load resistor for producing a predetermined voltage across said cell indicative of the intensity of the primary color to which each respective cell is responsive, (c) voltage sensing means connected to each photoelectric cell including a transistor having an emitter-collector circuit connected to said source and a load resistor for producing a voltage having a predetermined ratio relative to the voltage across each respective photoelectric cell to which the base of its associated transistor is connected, the voltage produced by said voltage sensing means in one instance being equal to that across one of said photoelectric cells and the voltage produced by said voltage sensing means for the remaining photoelectric cells having a predetermined ratio relative to the voltage produced by the voltage sensing means for said one photoelectric cell, and (d) null meters connecting the voltage sensing means of said one photoelectric cell with the voltage sensing means of each remaining photoelectric cell and operable to indicate a null when the predetermined ratio distribution of the primary colors remain constant regardless of variations in intensity of the light beam and operable to deviate from their null reading whenever a change in the distribution ratio of such primary colors occurs in the light beam impinging on said photoelectric cells.

5. A compensating system operable to compensate for the undesirable characteristics of photoelectric cells in a color balancing bridge circuit for determining the ratio of light of the primary colors in the light beam emerging from a photographic printer and enlarger comprising:

(a) a source of electrical energy of high and low voltage magnitude, (b) a plurality of photoelectric cells respectively responsive to the distribution of the primary colors of green, red and blue present in the light beam impinging thereon with the impedance of each said photoelectric cell being variable in accordance with the intensity of the particular primary color to which it is responsive, (c) voltage regulating means comprising a transistor connected to said source of high-voltage magnitude through a load resistor and having an emitter-collector circuit including each of said photoelectric cells and an individual series connected load resistor therefor to produce a reference voltage across each photoelectric cell corresponding to approximately one-half that of said source of low-voltage magnitude, (d) voltage sensing means connected to each photoelectric cell including a transistor having an emitter-collector circuit connected to said source of lower voltage magnitude and a load resistor for producing a predetermined voltage, such voltage in one instance being equal to that across one of said photoelectric cells as determined by the impedance thereof in response to the intensity of red radiations in the light beam impinging thereon, and the voltage across the remaining photoelectric cells as produced by their associated voltage sensing means having a predetermined ratio relative to the voltage produced by said one photoelectric cell depending upon the green and blue radiations in the light beam impinging on said remaining photoelectric cells;

(e) a base-collector circuit for the transistor of said voltage regulating means and operable to vary the voltage across the photoelectric cell responsive to red radiations inversely to changes in its impedance to maintain the voltage thereacross substantially constant, and (f) indicator means connecting the voltage sensing means of said photoelectric cell responsive to red radiations with both the voltage sensing means of said photoelectric cells responsive to green and blue radiations and operable to indicate when a difference exists in the ratio of the predetermined voltage across the respective photoelectric cells due to a change in the distribution ratio between the primary colors of green, red and blue in the light beam impinging on said photoelectric cells.

References Cited
UNITED STATES PATENTS

| | | | |
|---|---|---|---|
| 3,069,971 | 12/1962 | Simmon et al. | 250—226 X |
| 3,097,563 | 7/1963 | Weisglass | 88—14 |
| 3,199,402 | 8/1965 | Hunt et al. | 88—24 |
| 3,229,569 | 1/1966 | Frost et al. | 250—208 X |
| 3,293,033 | 12/1966 | Maddock et al. | 88—24 |

ARCHIE R. BORCHELT, *Primary Examiner.*

M. A. LEAVITT, *Assistant Examiner.*